United States Patent [19]

Ishii et al.

[11] Patent Number: 5,145,587
[45] Date of Patent: Sep. 8, 1992

[54] METHOD FOR TREATMENT OF WASTE WATER

[75] Inventors: Tooru Ishii, Himeji; Kiichiro Mitsui, Akashi; Kunio Sano, Ako, all of Japan; Akira Inoue, Hirakata, all of Japan

[73] Assignee: Nippon Shokubai Kagaku Kogyo Co., Ltd., Osaka, Japan

[21] Appl. No.: 622,599

[22] Filed: Dec. 5, 1990

[30] Foreign Application Priority Data

Dec. 6, 1989 [JP] Japan .................. 1-315164

[51] Int. Cl.$^5$ .................. C02F 1/72; C02F 1/78
[52] U.S. Cl. .................. 210/759; 210/760; 210/762; 502/302; 502/303; 502/304
[58] Field of Search .............. 210/758, 759, 760, 761, 210/762, 763; 502/302, 303, 304, 326, 309, 350

[56] References Cited

U.S. PATENT DOCUMENTS

| | | | |
|---|---|---|---|
| 3,823,088 | 7/1974 | Box, Jr. et al. | 210/763 |
| 3,988,259 | 10/1976 | Ray | 210/762 |
| 4,141,828 | 2/1979 | Okada et al. | 210/762 |
| 4,268,399 | 5/1981 | Box, Jr. et al. | 210/762 |
| 4,294,706 | 10/1981 | Kakihara et al. | 210/762 |
| 4,751,005 | 6/1988 | Mitsui et al. | 210/762 |

FOREIGN PATENT DOCUMENTS

| | | | |
|---|---|---|---|
| 86584 | 6/1980 | Japan | 210/762 |
| 2-58098 | 10/1990 | Japan | 210/762 |

*Primary Examiner*—Peter Hruskoci
*Assistant Examiner*—Neil M. McCarthy
*Attorney, Agent, or Firm*—Burns, Doane, Swecker & Mathis

[57] ABSTRACT

A method for the treatment of waste water, which comprises wet oxidizing said waste water with a molecular oxygen-containing gas of an amount 1.0 to 1.5 times the amount thereof theoretically necessary for decomposing at least one substance selected from the group consisting of organic substances and inorganic substances present in said waste water to nitrogen, carbon dioxide, and water at a temperature not exceeding 370° C. under a pressure enough for said waste water to retain a liquid phase in the presence of a solid catalyst comprising of a first catalytic component formed of titanium dioxide, a second catalytic component formed of the oxide of an element of lanthanide series, and a third catalytic component containing at least one metal selected from the group consisting of manganese, iron, cobalt, nickel, tungsten, copper, silver, gold, platinum, palladium, rhodium, ruthenium, and iridium or a water-insoluble or sparingly water-soluble compound of said metal.

15 Claims, No Drawings

METHOD FOR TREATMENT OF WASTE WATER

BACKGROUND OF THE INVENTION

1. Field of the Invention

This invention relates to a method for the wet oxidation of a waste water containing a chemical oxygen-demanding substance (hereinafter referred to as "COD" component) in the presence of a catalyst. More particularly, it relates to a method for efficient detoxification of a waste water containing harmful oxidizable organic or inorganic substances, i.e. a COD component, by the catalytic wet oxidation of the waste water in the presence of molecular oxygen thereby effecting conversion of such organic substances into harmless substances such as carbon dioxide, water, and nitrogen.

2. Description of the Prior Art

In the methods for treatment of waste water, the biochemical method called as an "activated sludge method" and the wet oxidation method called as "Zimmermann method" have been popular.

As universally known, the activated sludge method spends a long time in the decomposition of organic substances and requires the waste water to be diluted to a concentration fit for the growth of algae and bacteria and, therefore, has the disadvantage that the facilities for the activated sludge treatment demand a large floor area for their installation. Further in recent years, particularly in urban districts, the disposal of excess sludge arising from the treatment calls for a huge expense. The Zimmermann method effects oxidative decomposition of organic substances contained in a high concentration in an aqueous solution by introducing air under a pressure in the range of 20 to 200 atmospheres at a temperature in the range of 200° to 370° C. into the aqueous solution. This method requires to use a large reaction vessel because the reaction proceeds at a low velocity and consumes a long time in the decomposition of organic substances and also requires this reaction vessel to be made of a material of high durability. The method, therefore, has an economic problem in terms of the cost of equipment and the cost of operation of this equipment. Methods which use various oxidizing catalysts for the purpose of heightening the reaction velocity in the treatment have been proposed.

In the catalysts heretofore proposed for use in the method of catalytic wet oxidation, compounds of such noble metals as palladium and platinum (JP-A-49-44,556(1974)) and compounds of such heavy metals as cobalt and iron (JP-A-49-94,157(1974) have been popular. These catalysts have the aforementioned compounds deposited on spherical or cylindrical pieces of a carrier made of alumina, silica-alumina, silica gel, or activated carbon, for example. In the catalytic wet oxidation of a waste water, the waste water more often than not has the pH value thereof adjusted to a level exceeding 9 in advance of the treatment. Our study on these catalysts has revealed that, in the course of a protracted use, the catalysts suffer from loss of strength and reduction of size and, moreover, the carrier possibly succumbs to dissolution under the impact of the treatment. In the case of an alumina type catalyst, for example, the loss of strength tends to occur on account of exudation of alumina.

Recently, a method using titania or zirconia as a carrier for the purpose of solving the problem of this nature has been proposed (JP-A-58-64,188(1983)). This invention discloses a catalyst having a compound of such a noble metal as palladium or platinum and a compound of such a heavy metal as iron or cobalt deposited on spherical or cylindrical pieces of carrier made of titania or zirconia. The catalyst according with this invention is indeed recognized to possess highly satisfactory strength as compared with the catalyst using the conventional carrier. The catalysts of this class invariably come in a particulate form. They are not fully satisfactory in catalytic activity or durability. The titania type catalysts, for example, are liable to undergo loss of strength due to crystal transformation.

In some cases, the oxide of an element of the lanthanide series has been used as a catalyst. This catalyst, however, is not fully satisfactory in physical durability or moldability.

Methods using the combinations of a cerium compound with such composite oxides as $TiO_2$-$ZrO_2$, $TiO_2$-$SiO_2$-$ZrO_2$, and $TiO_2$-$ZnO$ for the purpose of further improving the conventional catalysts have been proposed (JP-A-63-158,189(1988) and 1-218,684(1989) to 1-218,686(1989)). These catalysts are notably improved in durability and activity. They, however, prove at times to be inferior in initial activity to catalysts having catalytically active substances deposited exclusively on ceria.

Incidentally, in the wet oxidation of a waste water, the water is required to be treated in a very large amount. More often than not, therefore, the method of using a fixed bed of catalyst in a flow system is adopted for the reaction. Further, the waste water frequently contains solid substances. In these cases, when the catalyst is in a particulate form, the fixed bed suffers from heavy pressure loss due to the passage of the waste water therethrough and consequently fails to give to the waste water the treatment at a high linear velocity and, therefore, requires to possess a large cross section for the flow of the waste water and give a proportionate addition to the floor area for the reaction vessel. In the case of the treatment of a waste water entrailing solid substances, the resistance offered by the fixed bed to the flowing waste water in consequence of the clogging of the bed with the solid substances is increased so much as to raise the running cost of the apparatus and render lasting operation of the apparatus impracticable. Specifically, in the treatment of waste water by the catalytic wet oxidation technique, since the reaction is carried out at an elevated temperature under a high pressure, the increase in the floor area to be occupied by the reaction vessel entails a fatal problem of boosting the cost of equipment.

The fluidized bed method which fluidizes a powdery catalyst for the purpose of lowering the pressure loss caused by a catalyst bed has been proposed. This method has not yet found utility in any practical application, however, because it entails the disadvantage that the treatment requires use of a huge reaction vessel owing to the inevitable decrease in the concentration of the catalyst and the separation of the catalyst from the treated waste water is difficult.

There is also a method which effects oxidative decomposition of organic substances in a waste water at normal room temperature under normal pressure by the use of ozone or hydrogen peroxide as an oxidizing agent. JP-A-58-55,088(1983), for example, discloses a method which effects oxidative decomposition of organic substances such as humic acid contained in a waste water at 20° C. under normal pressure in the absence of a catalyst by the use of ozone and hydrogen peroxide. JP-A-58-37,039(1983) discloses a method which comprises adding a surfactant to a waste water containing an organic compound possessing an aromatic ring, mixing the resultant mixture with at least one member selected from among compounds of transition metals and alkaline earth metal compounds, and then bringing ozone into contact with the produced mixture at normal room temperature under a normal pressure and therefore effecting oxidative decomposition of the organic compound. Since the former method carries out the treatment in the absence of a catalyst, it is incapable of effectively treating a waste water having sparingly oxidizable substances suspended therein. Since the latter method uses the metallic ions of a transition metal or an alkaline earth metal as a catalyst, the treated waste water cannot be released in its unmodified form from the equipment and must be purged of the metallic ions in advance of the release and, therefore, has the disadvantage that the treatment requires an extra step for aftertreatment. Both these two methods have the disadvantage that since they treat the waste water at normal room temperature under normal pressure, the treatment consumes expensive ozone in a large amount, the reaction proceeds at a low velocity, the decomposition of organic substances occurs in a low ratio, and the ozone partially escapes the reaction and the unaltered ozone necessitates a treatment for detoxification.

An object of this invention, therefore, is to provide a method for effecting efficient and lasting treatment of waste water.

Another object of this invention is to provide a method for treating waste water efficiently at a high linear velocity.

Yet another object of this invention is to provide a method for treating a waste water containing a solid substance stably at a high linear velocity for a long time.

SUMMARY OF THE INVENTION

These objects are accomplished by a method for the treatment of waste water, which comprises wet oxidizing waste water with a molecular oxygen-containing gas of an amount 1.0 to 1.5 times the theoretical amount thereof necessary for thoroughly decomposing at least one substance selected from the group of organic substances and inorganic substances present in said waste water into nitrogen, carbon dioxide, and water at a temperature of not higher than 370° C. under a pressure enough for the waste water to retain a liquid phase in the presence of a solid catalyst comprising a first catalytic component formed of titanium dioxide, a second catalytic component formed of the oxide of an element of the lanthanide series, and a third catalytic component containing at least one metal selected from the group consisting of manganese, iron, cobalt, nickel, tungsten, copper, silver, gold, platinum, palladium, rhodium, ruthenium, and iridium or a water-insoluble or sparingly water-soluble compound of the metal.

This invention further concerns a method for the treatment of waste water, wherein the catalyst is in the form of a monolithically constructed structure. This invention also concerns a method for the treatment of waste water, wherein the catalyst is in the form of honeycombs so shaped that the through holes thereof have an equivalent diameter in the range of 2 to 20 mm, the cells thereof have a wall thickness in the range of 0.5 to 3 mm, and the openings thereof account for a ratio in the range of 50 to 80%. Further, this invention concerns a method for the treatment of waste water, wherein the simultaneous passage of the waste water and the oxygen-containing gas through the catalyst is effected in the presence of ozone and/or hydrogen peroxide.

The catalyst contemplated by this invention is characterized by using titanium dioxide and the oxide of an element of lanthanide series as catalytic components.

The oxides of elements of the lanthanide series exhibit a catalytical activity even in their simple forms. Since they have poor moldability, however, they cannot be easily molded in the shape of pellets or honeycombs. During their use in a long term reaction for the treatment, they are degraded in physical strength and this degradation forms a cause for deterioration of their catalytic activity.

We have found that this problem can be solved by the combinations of titanium dioxide and the oxides of elements of the lanthanide series. These combinations are excellent in moldability and in physical stability as well, sparingly susceptible of degradation in strength and activity of catalyst, and capable of withstanding a long term use.

When the powder obtained by coprecipitating the titanium compound and the lanthanide compound, impregnating, and intimately mixing the mixture as with a ball mill mixer, and calcining the resultant powder is used as a raw material for the catalyst, it produces a desirable effect of lending itself to improving the homogeneity of catalyst and to further enhancing the stability of strength and activity.

The adoption of the technique of coprecipitation proves to be particularly advantageous among other conceivable techniques in the sense that the coprecipitation increases the BET (Brunauer-Emmet-Teller) specific surface area of the powder, fairly facilitates the molding of the powder in the shape of honeycombs, and widens the variety of catalyst shapes selectable to suit a given waste water.

The catalyst of this invention is sparingly decomposable under the conditions of wet oxidation and, therefore, capable of exhibiting a high catalytic activity to acetic acid which often persists in a high concentration in varying waste water during the treatment. The catalyst of this invention, therefore, effects the treatment of acetic acid with high efficiency and manifests an outstanding effect in enhancing the efficiency of treatment of varying waste water at low temperatures.

EXPLANATION OF THE PREFERRED EMBODIMENT

The catalyst to be used in the present invention contains titanium dioxide as the first catalytic component, the oxide of an element of lanthanide series as the second catalytic component, and at least one metal selected from the group consisting of manganese, iron, cobalt, nickel, tungsten, copper, silver, gold, platinum, palladium, rhodium, ruthenium, and iridium or a water-insoluble or sparingly water-soluble compound of the metal as the third catalytic component.

The BET surface area of the titanium dioxide as the first catalytic component of the catalyst to be used in the present invention is desired to exceed 10 $m^2/g$, preferably to fall in the range of 30 to 120 $m^2/g$.

At least one of the oxides of the elements of Lanthanide series such as lanthanum, cerium, praseodymium, neodymium, and samarium can be used as the second catalytic component serving the purpose of improving the stability of catalyst. Particularly, at least one of the oxides of lanthanum, cerium, and neodimium among other elements of lanthanide series proves to be desirable because it is effective in enhancing the stability of catalyst and the catalytic activity.

As respect the proportions of the catalytic components of the catalyst to be used in this invention, the proportion of the first catalytic component is preferable to be in the range of 5 to 98% by weight as oxide, that of the second catalytic component in the range of 2 to 95% by weight as oxide, and that of the third component in the range of 0.05 to 25% by weight as metal or compound. Preferably, the amount of manganese, iron, cobalt, nickel, tungsten, copper, and silver among other elements to be used in the composition of the third catalytic component is in the range of 0 to 25% by weight as compound (oxide or sulfide, for example) and the amount of platinum, gold, palladium, rhodium, ruthenium, and iridium to be used is in the range of 0 to 10% by weight as metal (providing that the total amount of the two species of metals mentioned above is in the range of 0.05 to 25% by weight). More preferably, the proportion of the first catalytic component is in the range of 10 to 96% by weight as oxide, that of the second catalytic component in the range of 4 to 90% by weight as oxide, and that of the third catalytic component in the range of 0.1 to 9% by weight as metal or compound. Still more desirably, the proportion of the first catalytic component is in the range of 10 to 84% by weight as oxide, that of the second catalytic component in the range of 16 to 90% by weight as oxide, and that of the third catalytic component in the range of 0.1 to 9% by weight as metal or compound. Preferably, the amount of manganese, iron, cobalt, nickel, tungsten, copper, and silver among other metals available for the composition of the third catalytic component is in the range of 0 to 9% by weight as compound and the amount of platinum, gold, palladium, rhodium, ruthenium, and iridium to be used is in the range of 0 to 5% by weight as metal (providing that the total amount of the two species of metals mentioned above is in the range of 0.1 to 9% by weight). Incidentally, the total amount of the first, second, and third catalytic components is 100% by weight.

If the proportion of the third catalytic component deviates from the range mentioned above, the produced catalyst is deficient in oxidative activity. In the case of such a noble metal as platinum, palladium, or rhodium, the cost of raw material is unduly high and the produced catalyst is incapable of manifesting a sufficient effect proportionate to the cost. If the proportion of the first catalytic component and that of the second catalytic component deviate from the respective ranges mentioned above, the produced catalyst is deficient in resistance to hot water and undesirable in terms of catalyst life.

The catalyst to be used in the present invention is preferable to be composed as defined above. The shape of this catalyst may be selected from among various shapes such as pellets, beads, rings, saddles, powder, random fragments, and integrally constructed structure such as honeycombs, for example. Among other shapes mentioned above, that of honeycombs proves to be particularly desirable. In this particular shape, the through holes have an equivalent diameter in the range of 2 to 20 mm, preferably 4 to 12 mm. If this equivalent diameter is less than 2 mm, the through holes incur heavy pressure loss and, particularly when the waste water contains solid substances, tend to be clogged possibly to the extent of rendering a protracted use of the catalyst impracticable. If the equivalent diameter exceeds 20 mm, though the pressure loss is small and the possibility of clogging is low, the amount of the catalyst to be used for manifestation of a stated efficiency of treatment must be increased proportionately to the increase in the diameter. The diameter of the through holes is limited by the relation between the efficiency of treatment and the performance of the catalyst itself.

The cells have a wall thickness in the range of 0.5 to 3 mm, preferably 0.5 to 2 mm. If the wall thickness is less than 0.5 mm, the produced catalyst enjoys the advantage that it incurs only a small pressure loss and acquires a reduction in weight and yet suffers from the disadvantage that the catalyst loses mechanical strength. If the wall thickness exceeds 3 mm, the catalyst has sufficient mechanical strength and yet suffers from the disadvantage that it experiences heavy pressure loss.

For the same reason as given above, the ratio of openings is in the range of 50 to 80%, preferably 62 to 76%.

With due respect to the true state of affairs mentioned above, the catalyst of the shape of honeycombs to be used particularly preferably in the present invention has through holes 2 to 20 mm in equivalent diameter and cells 0.5 to 3 mm in wall thickness and openings 50 to 80% in ratio. Even under such severe reaction conditions as a high reaction temperature in the range of 100° to 370° C. and a high reaction pressure enough for waste water to retain a liquid phase, the honeycomb-shaped catalyst fulfilling the requirements mentioned above possesses ample mechanical strength and a sufficiently large geometric surface area. It, therefore, excels in durability and allows waste water to be treated at a high linear velocity with low pressure loss. Even when the waste water contains solid substances, this catalyst is enabled to retain high activity over a long period without entailing the phenomenon of clogging.

The cross-sectional shape of the through holes may be a rectangle, hexagon, or a corrugated circle on the condition that the equivalent diameter of the through holes is in the range mentioned above.

In the present invention, it is preferable to use molecular oxygen and ozone and/or hydrogen peroxide as oxidizing agents because they enable such organic compounds as acetic acid which are held to be rather insusceptible of oxidation to be decomposed with high efficiency and allow the reaction to proceed at relatively low temperature and pressure. Further, since the catalyst of this invention possesses an ability to decompose ozone to oxygen, it is characterized by possessing the advantage of substantially decomposing the waste ozone and preventing the waste ozone from leaking into the ambient air.

The amount of the ozone to be used is sufficient in the range of 0.001 to 1.2 mols, preferably 0.003 to 0.6 mol, per mol of the amount of oxygen theoretically necessary for effecting thorough decomposition of the organic and inorganic substances present in the waste water into nigrogen, carbon dioxide, and water. The amount of hydrogen peroxide to be used is sufficient in the range of 0.01 to 1.8 mols, preferably 0.003 to 0.2 mol, per mol of the aforementioned theoretical amount of oxygen. When ozone and/or hydrogen peroxide is used in combination with molecular oxygen, though the reaction temperature varies with the behavior of the waste water, the amount of the oxidizing agent to be used, and so on, it is lower than when molecular oxygen alone is used. In case where the reaction temperature falls in the range of 200° to 300° C. when the molecular oxygen is used, it falls approximately in the range of 100° to 250° C. when the oxidizing agent is additionally used.

The starting raw material for the titanium to be used in the first catalytic component of the present invention may be selected from among such inorganic titanium compounds as titanium chloride, titanium sulfate, titanium hydroxide, titanium dioxide, and titania sol and such organic titanium compounds as titanium oxalate and tetraisopropyl titanate.

The starting materials for elements of lanthanide series usable for the second catalytic component of this invention include oxides, hydroxides, and inorganic salts, for example. The starting raw materials for cerium are cerium acetate, cerium nitrate, cerium sulfate, cerium oxide, and ceria sol, for example. The addition of this starting material to the titanium dioxide can be favorably attained by the following methods.

(1) A method which comprises dissolving a salt of a lanthanide series element in a solution of a titanium salt, adding ammonia to the resultant solution thereby inducing precipitation, washing the precipitate, drying it, and calcining the dried precipitate at a temperature in the range of 300° to 900° C.

(2) A method which comprises suspending a finely powdered oxide of a lanthanum series element in a solution of a titanium salt, adding ammonia to the resultant solution thereby inducing precipitation, washing the precipitate, drying it, and calcining the dried precipitate at a temperature in the range of 300° to 900° C.

(3) A method which comprises impregnating uncalcined $TiO_2$ with a salt solution of a lanthanide series element, drying the impregnated titanium dioxide, and calcining the dried titanium dioxide at a temperature in the range of 300° to 900° C.

(4) A method which comprises adding a finely powdered oxide of a lanthanide series element to uncalcined $TiO_2$, subjecting the resultant mixture to wet or dry pulverization and mixture in a ball mill, drying the pulverized mixture, and calcining the mixture at a temperature in the range of 300° to 900° C.

(5) A method which comprises impregnating precalcined $TiO_2$ with a salt solution of a lanthanide series element, drying the pregnated titanium dioxide, and calcining the dried titanium dioxide at a temperature in the range of 300° to 900° C. Optionally, in the impregnation, the aforementioned salt solution may be used in the form of a mixed solution with a salt solution of the third catalytic component.

In the methods mentioned above, those of (1) to (4) probe to be preferable. In these four desirable methods, the method of (1) proves to be particularly preferable.

The starting materials which are effectively usable for the composition of the third catalytic component include oxides, hydroxides, inorganic salts, and organic salts, for example. They are suitably selected from among ammonium salts, oxalates, nitrates, sulfates, and halides, for example.

The production of a catalyst by the addition of manganese, iron, nickel, cobalt, tungsten, copper, silver, gold, platinum, palladium rhodium, ruthenium, and/or iridium to the first and second catalytic components is accomplished by causing an aqueous solution of salts of these metals to be deposited by means of impregnation on a molded structure of the first and second catalytic components, drying the impregnated structure, and calcining the dried structure.

Otherwise, the production may be attained by a procedure which comprises impregnating a carrier formed of the first catalytic component with an aqueous solution of the mixture of metal salts respectively of the second catalytic component and the third catalytic component, drying the impregnated aggregate, and calcining the dried aggregate.

Still otherwise, the production may be accomplished by a procedure which comprises adding an aqueous solution of the aforementioned metal salts in combination with a molding agent to a powder formed of the first and second catalytic components and kneading and molding the resultant mixture.

When the catalyst to be used in the present invention is produced by calcining, at a temperature in the range of 600° to 900° C., a powdered or molded aggregate formed of the first and second catalytic components, it enjoys a still greater improvement in physical durability under the reaction conditions.

In accordance with the present invention, the supernatant and the sedimented activated sludge resulting from the treatment with activated sludge, the waste water from fermentation, the waste water from the process of polymerization of organic compounds, the cyan-containing waste water, the phenol-containing waste water, the oil-containing waste water, the waste water from other chemical plants, the industrial effluents from food plants, and the waste waters containing such oxidizable organic or inorganic substances as excrements, sewage, and sewer sludge can be treated by wet oxidation. When the honeycomb-shaped catalyst is used in the present invention, the treatment can be continued stably for a long time even on a waste water containing solid substances in a concentration of 0.1 g/liter.

As respects the reaction conditions in the present invention, the reaction temperature is not higher than 370° C., and is generally in the range of 100° to 370° C., preferably 160° to 300° C. The pressure of the reaction system is only required to be enough for the waste water inside the reaction column to retain a liquid phase, namely a pressure approximately in the range of 1 to 230 kg/m². The molecular oxygen-containing gas to be fed to the reaction system is used in an amount 1 to 1.5 times the amount of oxygen necessary for the oxidative decomposition. The amount of the catalyst to be used is approximately in the range of 5 to 99% of the inner volume of the reaction column. The waste water is fed in combination with the molecular oxygen-containing gas to the catalyst bed at such a rate that the residence time for oxidation is in the range of 2 to 120 minutes, preferably 4 to 60 minutes.

The molecular oxygen-containing gases which are effectively usable in this invention include air, the mixed gas of oxygen and air, and a gas generally called as an oxygen-enriched air, for example. Though the pH value of the reaction system may be on the acid side or on the alkali side, it is desired to be not more than 9, preferably not more than 7.

Concerning the reaction conditions to be adopted where ozone and/or hydrogen peroxide is used as an oxidizing agent in combination with molecular oxygen, the reaction temperature is in the range of 100° to 250° C., the reaction pressure is to be enough for the waste water to retain a liquid phase within the reaction tower, specifically a pressure in the range of 1 to 200 kg/cm², and the residence time is in the range of 3 to 120 minutes, preferably 5 to 60 minutes. The amount of ozone to be used is in the range of 0.001 to 1.2 mols, preferably 0.003 to 0.6 mol, per mol of the aforementioned theoretical amount of oxygen. Then, the amount of hydrogen peroxide to be used is in the range of 0.001 to 1.8 mols, preferably 0.003 to 0.2 mol, per mol of the theoretical amount of oxygen.

Now, the present invention will be described more specifically below with reference to working examples and controls. This invention is not limited to these examples.

EXAMPLE 1

An oxide containing titanium and cerium was prepared by the following method. As the source for titanium, a sulfuric acid aqueous solution of titanyl sulfate of the following composition was used.

| $TiOSO_4$ (reduced to $TiO_2$) | 250 g/liter |
| Total $H_2SO_4$ | 1,100 g/liter |

A solution of 9.6 kg of cerous nitrate [$Ce(NO_3)_3 \cdot 6H_2O$] in 100 liters of water and 4.7 liters of the aforementioned sulfuric acid aqueous solution of titanyl sulfate added thereto were vigorously mixed. The resultant mixture was kept at a temperature of about 30° C. and thoroughly stirred and aqua ammonia was gradually added dropwise thereto until the pH value reached 8. Then, the produced mixture was left standing in the ensuant state for 15 hours. The gel consequently obtained was separated by filtration, washed with water, dried at 200° C. for 10 hours, then calcined in the open air at 650° C. for 3 hours, and further pulverized, to obtain a powder. This powder was found to have a composition of $TiO_2:CeO_2=4:6$ (molar ratio) [23.6:76.4 (weight ratio)] and a BET specific surface area of 50 $m^2/g$. In a kneader, 4 kg of the powder mentioned above, 1.4 kg of water, and 120 g of starch were thoroughly kneaded. The resultant mixture was kneaded during simultaneous addition thereto of a suitable amount of water, extrusion molding the kneaded mixture into a honeycomb die having an aperture diameter (equivalent diameter of through holes) of 4 mm, a cell wall thickness of 0.7 mm, and an opening ratio of 72%, dried at 120° C. for six hours, and calcined at 500° C. for six hours.

The molded structure consequently obtained was impregnated with an aqueous platinic chloride solution, dried at 120° C. for six hours, and then calcined at 400° C. for six hours. The finished catalyst had Pt carried in a ratio of 0.4% by weight. The composition of this catalyst was $TiO_2:CeO_2:Pt=23.5:76.1:0.4$ (weight ratio).

EXAMPLE 2

A powder of dry titanium dioxide was obtained by following the procedure of Example 1, except that the use of cerous nitrate and the step of calcination were omitted. This powder had a water content of 5% by weight. 3.4 kg of the powder was mixed with a solution of 4.4 kg of cerous nitrate in 10 liters of water. The mixture was dried at 80° C. for 12 hours and then at 120° C. for six hours, calcined in the open air at 500° C. for five hours, and pulverized, to obtain a powder. The powder was found to have a composition of $TiO_2:CeO_2=8:2$ (molar ratio) (64.9:35.1 (weight ratio)) and a BET specific surface area of 90 $m^2/g$.

In a kneader, 4 kg of the powder, 1.5 kg of water, and 40 g of starch were thoroughly kneaded. The resultant mixture was extrusion molded into cylindrical pellets 5 mm in diameter and 6 mm in length, dried at 120° C. for six hours, and calcined at 700° C. for three hours.

Then, a catalyst having Ru carried in a ratio of 1.5% by weight was obtained by following the procedure of Example 1, except that an aqueous ruthenium nitrate solution was used in the place of the aqueous platinic chloride solution. The composition of this catalyst was $TiO_2:CeO_2:Ru=64.0:34.5:1.5$ (weight ratio).

EXAMPLE 3

A mixture obtained by adding to 3.9 kg of a commercially available anatase type titanium dioxide powder (BET specific surface area 70 $m^2/g$) a solution of 2.4 kg of cerous nitrate in 5 liters of water was dried at 80° C. for 12 hours and at 120° C. for six hours and then pulverized and mixed in a ball mill for four hours. The produced mixed powder was calcined in the open air at 700° C. for three hours and pulverized, to obtain a powder. The powder was found to have a composition of $TiO_2:CeO_2=9:1$ (molar ratio) (80.7:19.3 (weight ratio)) and a BET specific surface area of 40 $m^2/g$.

A honeycomb-shaped catalyst having an aperture diameter (equivalent diameter) of 6 mm, a cell thickness of 1 mm, an opening ratio of 73%, and a Pt deposition ratio of 0.6% by weight was obtained by following the procedure of Example 1. The composition of this catalyst was $TiO_2:CeO_2:Pt=80.2:19.2:0.6$ (weight ratio).

EXAMPLE 4

Waste water treatment by the wet oxidation technique was carried out by the following procedure severally using the catalysts obtained in Examples 1 to 3. A reaction tube made of stainless steel was packed with a given catalyst and a preheated mixture of waste water with air of an oxygen concentration of 21% was continuously introduced for 4,000 hours into the reaction tube via the lower part thereof. The waste water samples taken at the inlet and the outlet of the reaction tube were analyzed for COD (Cr) to determine the ratio of removal in the initial stage of treatment and after 4,000 hours' treatment. The catalyst was tested for strength in the initial stage of reaction and after 4,000 hours' reaction to determine the strength ratio of the catalyst. The waste water subjected to the treatment had a COD (Cr) of 20 g/liter and a pH of 6. The reaction was carried out at a reaction temperature of 230° C. under a reaction pressure of 50 kg/$cm^2$, with the waste water introduced at a space velocity of 1.2 $hr^{-1}$ (based on empty tower) and the air at a space velocity of 100 $hr^{-1}$ (based on empty tower under standard conditions) into the reaction tube. The results of the treatment are shown in Table 1.

TABLE 1

| | COD removal ratio (%) | | Catalyst strength ratio |
| Catalyst | Initial stage | After 4,000 hrs' reaction | After 4,000 hrs' reaction/initial stage |
| --- | --- | --- | --- |
| Example 1 | 99 | 99 | 0.96 |
| Example 2 | 98 | 98 | 0.95 |
| Example 3 | 98 | 97 | 0.92 |

Control 1

1.2 kg of water and 40 g of starch were added to 4 kg of a commercially avilable cerium oxide powder, and kneaded thoroughly by a kneader. The mixture was extruded into a cylindrical pellet having 5 mm of diameter and 6 mm of length and calcined at 120° C. for 6 hours and at 700° C. for 3 hours. A catalyst having a Pt deposition ratio of 0.6% by weight was obtained by following the procedure of Example 1, except that the cylindrical pellets were used instead. When this catalyst was used in the reaction under the conditions of Example 4, though the COD removal ratio was 99% in the initial stage of treatment, the catalyst strength decreased and powders of the catalyst generated, and the efficiency of treatment likewise declined with the elapse of time. After 400 hours' treatment, amount of the catalyst decreased and the reaction proceeded sparingly.

EXAMPLE 5

Waste water treatment was carried out for 500 hours at a reaction temperature of 200° C. under a reaction pressure of 45 kg/cm$^2$, except that a mixed gas containing oxygen in a concentration of 18% and ozone in a concentration of 1% was used in the place of air having an oxygen concentration of 21% and the catalyst obtained in Example 1 was used instread. In this treatment, the COD removal ratio was found to be 97%.

EXAMPLE 6

Waste water treatment was carried out for 500 hours by following the procedure of Example 5, except that an aqueous 3% hydrogen peroxide solution was supplied at a space velocity of 0.05 hr$^{-1}$ (based on empty column) in combination with the mixed gas and the catalyst obtained in Example 1 was used instead. The COD removal ratio was found to be 98%.

EXAMPLE 7

A powder of a composition of $TiO_2:La_2O_3$ - 78.3:21.7 (weight ratio) was obtained by following the procedure of Example 1, except that 702 g of lanthanum nitrate $(La(NO_3)_3 \cdot 6H_2O)$ and 3.8 liters of a sulfuric acid solution of titanyl sulfate was used instead. Pellets of the same shape as in Example 2 were obtained by processing the powder in accordance with the procedure of Example 2 and then subjected to deposition of rhodium by impregnation. The composition of the produced catalyst was $TiO_2:La_2O_3:Rh$ =77.3:21.5:1.2 (weight ratio).

EXAMPLE 8

In 40 liters of water, 1.95 kg of titanium tetrachloride (TiCl$_4$) was dissolved during simultaneous elimination of heat. In the resultant solution, 80 g of finely powdered neodymium oxide (Nd$_2$O$_3$) was dispersed and kept thoroughly stirred and, at the same time, adjusted to pH 9 by gradual dropwise addition thereto of aqua ammonia. The resultant mixture was left standing for 15 hours. The gel consequently formed therein was separated by filtration, washed with water, dried at 180° C. for five hours, and then calcined in the open air at 800° C. for two hours. The powder obtained after the subsequent step of pulverization had a BET specific surface area of 8 m$^2$/g. Same shape of a pelletized catalyst having a composition of $TiO_2:Nd_2O_3$: $MnO_2$ = 82:8:10 (weight ratio) was obtained by following the procedure of Example 2, except that manganese nitrate was added to the powder.

Control 2

Same shape of a pelletized catalyst having a composition of $TiO_2:MnO_2$ = 90:10 (weight ratio) was obtained by following the procedure of Example 8, except that a commercially avilable titanium dioxide powder (BET specific surface area 140 m$^2$/g) was used instead.

EXAMPLE 9

Waste water treatment of the wet oxidation technique was carried out by the following procedure severally using the catalysts obtained in the examples and the controls cited above. A reaction tube made of stainless steel was packed with 1 liter of a given catalyst (catalyst bed length 2 m) and a preheated mixture of waste water with air of an oxygen concentration of 21% was continuously introduced for 4,000 hours into the reaction tube through the lower part thereof. The waste water samples taken at the inlet part and the outlet part of the reaction tube were tested for COD (Cr) to determine the removal ratio in the initial stage of reaction and after 4,000 hours' reaction. The catalyst strength was tested in the initial stage of reaction and after 4,000 hours' reaction to determine the catalyst strength ratio. The waste water subjected to the treatment contained 12,000 ppm of acetic acid and 1,000 ppm of ammonia. The treatment was carried out at a reaction temperature of 230° C. under a reaction pressure of 50 kg/cm$^2$, with the waste water introduced at a space velocity of 1.2 hr$^{-1}$ (based on empty tower) and the air at a space velocity of 60 hr$^{-1}$ (based on empty column under standard conditions) into the reaction tube. The results obtained are shown in Table 2.

TABLE 2

| Catalyst | Acetic acid removal ratio (%) | | NH$_3$ removal ratio (%) | | Catalyst strength ratio |
|---|---|---|---|---|---|
| | Initial stage | After 4,000 hrs' reaction | Initial stage | After 4,000 hrs' reaction | After 4,000 hrs' reaction/ Initial stage |
| Example 1 | 99 | 99 | 99 | 99 | 0.96 |
| Example 2 | 98 | 98 | 99 | 99 | 0.95 |
| Example 7 | 98 | 98 | 99 | 99 | 0.97 |
| Example 8 | 92 | 90 | 94 | 91 | 0.95 |
| Control 2 | 71 | 58 | 63 | 51 | 0.87 |

We claim:

1. A method for the treatment of waste water, which comprises wet oxidizing said waste water with a molecular oxygen-containing gas of an amount 1.0 to 1.5 times the amount thereof theoretically necessary for decomposing at least one substance selected from the group consisting of organic substances and inorganic substances present in said waste water to nitrogen, carbon dioxide, and water at a temperature not exceeding 370° C. under a pressure enough for said waste water to retain a liquid phase in the presence of a solid catalyst comprising a first catalytic component formed of titanium dioxide, a second catalytic component formed of the oxide of an element of the lanthanide series, wherein said first catalytic component and said second catalytic component are mixed by a coprecipitation technique, and the resulting mixture is calcined, and a third catalytic component containing at least one metal selected from the group consisting of manganese, iron, cobalt, nickel, tungsten, copper, silver, gold, platinum, palladium, rhodium, ruthenium, and iridium or a water-insoluble or sparingly water-soluble compound of said metal is added to said calcined mixture.

2. A method according to claim 1, wherein the proportion of said first catalytic component is in the range of 5 to 98% by weight as oxide, that of said second catalytic component in the range of 2 to 95% by weight as oxide, and that of the third catalytic component in the range of 0.05 to 25% by weight as metal or oxide.

3. A method according to claim 2, wherein the amount of manganese, iron, cobalt, nickel, tungsten, copper, and silver to be used is in the range of 0 to 25% by weight as compound and that of platinum, gold, palladium, rhodium, ruthenium, and iridium is in the range of 0 to 10% by weight in the third catalytic component wherein the amounts are such that the total amount of said two species of metals is in the range of 0.05 to 25% by weight.

4. A method according to claim 3, wherein said first catalytic component accounts for a proportion in the range of 10 to 84% by weight as oxide, said second catalytic component for a proportion in the range of 16 to 90% by weight as oxide, and said third catalytic component for a proportion in the range of 0.1 to 9% by weight as metal or compound.

5. A method according to claim 2, wherein said first catalytic component accounts for a proportion in the range of 10 to 96% by weight as oxide, said second catalytic component for a proportion in the range of 4 to 90% by weight as oxide, and said third catalytic component for a proportion in the range of 0.1 to 9% by weight as metal or compound.

6. A method according to claim 5, wherein the amount of manganese, iron, cobalt, nickel, tungsten, copper, and silver to be used is in the range of 0 to 9% by weight as compound and the amount of platinum, gold, palladium, rhodium, ruthenium, and iridium is in the range of 0 to 5% by weight as metal wherein the amounts are such that the total amount of said two species of metals is in the range of 0.1 to 9% by weight in said third catalytic component.

7. A method according to claim 1, wherein said second catalytic component is the oxide of at least one element selected from the group consisting of lanthanum, cerium, praseodymium, neodymium, and samarium.

8. A method according to claim 7, wherein said second catalytic component is the oxide of at least one element selected from the group consisting of lanthanum, cerium, and neodymium.

9. A method according to claim 1, wherein said catalyst is a particulate aggregate.

10. A method according to claim 1, wherein said catalyst is an integrally constructed structure.

11. A method according to claim 10, wherein said catalyst is a honeycomb-shaped catalyst having through holes 2 to 20 mm in equivalent diameter, cells 0.5 to 3 mm in wall thickness, and openings 50 to 80% in ratio.

12. A method according to claim 1, wherein the reaction temperature is in the range of 100° to 370° C.

13. A method according to claim 1, wherein the passage of said waste water in combination with said molecular oxygen-containing gas through a bed of said catalyst is carried out in the presence of at least one member selected from the group consisting of ozone and hydrogen peroxide.

14. A method according to claim 13, wherein the amount of said ozone to be used is in the range of 0.001 to 1.2 mols, per mol of the amount thereof theoretically necessary for decomposing at least one substance selected from the group consisting of organic substances and inorganic substances present in said waste water into nitrogen, carbon dioxide gas, and water.

15. A method according to claim 13, wherein the amount of said hydrogen peroxide to be used is in the range of 0.001 to 1.8 mols, per mol of the theoretical amount thereof necessary for decomposing at least one substance selected from the group consisting of organic substances and inorganic substances present in said waste water into nitrogen, carbon dioxide gas, and water.

* * * * *